United States Patent [19]

Hrebicek

[11] 4,013,139

[45] Mar. 22, 1977

[54] VEHICLE BUMPER ASSEMBLY

[76] Inventor: James Hrebicek, 2327 S. 61st Ave., Cicero, Ill. 60650

[22] Filed: Aug. 7, 1975

[21] Appl. No.: 602,632

[52] U.S. Cl. ............................................ 180/108
[51] Int. Cl.² ...................................... B60R 19/02
[58] Field of Search ............... 293/2, 9, 10, 5, 84, 293/87; 180/91, 108; 267/116, 139, 172

[56] References Cited

UNITED STATES PATENTS

| | | | |
|---|---|---|---|
| 3,355,208 | 11/1967 | Brock | 180/91 X |
| 3,596,731 | 8/1971 | Fales | 180/108 |
| 3,703,300 | 11/1972 | Gillund et al. | 180/91 X |
| 3,789,948 | 2/1974 | Hrebicek | 293/2 X |
| 3,893,726 | 7/1975 | Strohschein | 180/108 X |
| 3,921,751 | 11/1975 | Sakakibara et al. | 180/108 |

*Primary Examiner*—Stanley H. Tollberg
*Assistant Examiner*—Norman L. Stack, Jr.
*Attorney, Agent, or Firm*—Charles F. Voytech

[57] ABSTRACT

An improved motor Speed Actuated Vehicle Bumper wherein a cam and linkage arrangement combined with a spring is provided to restrain an inward movement of a bumper under collision conditions. The restraint increases as the speed of the vehicle on which it is installed so that its effectiveness is substantially constant over a range of vehicle speeds. The present improvement utilizes the speed responsive restraint, but in addition, it provides means for gradually extending the bumper in accordance with the speed of the vehicle. Thus, in addition to increasing the restraint with vehicle speed, the travel of the bumper is also increased with speed thereby dissipating the force of a collision over a greater travel of the bumper.

3 Claims, 4 Drawing Figures

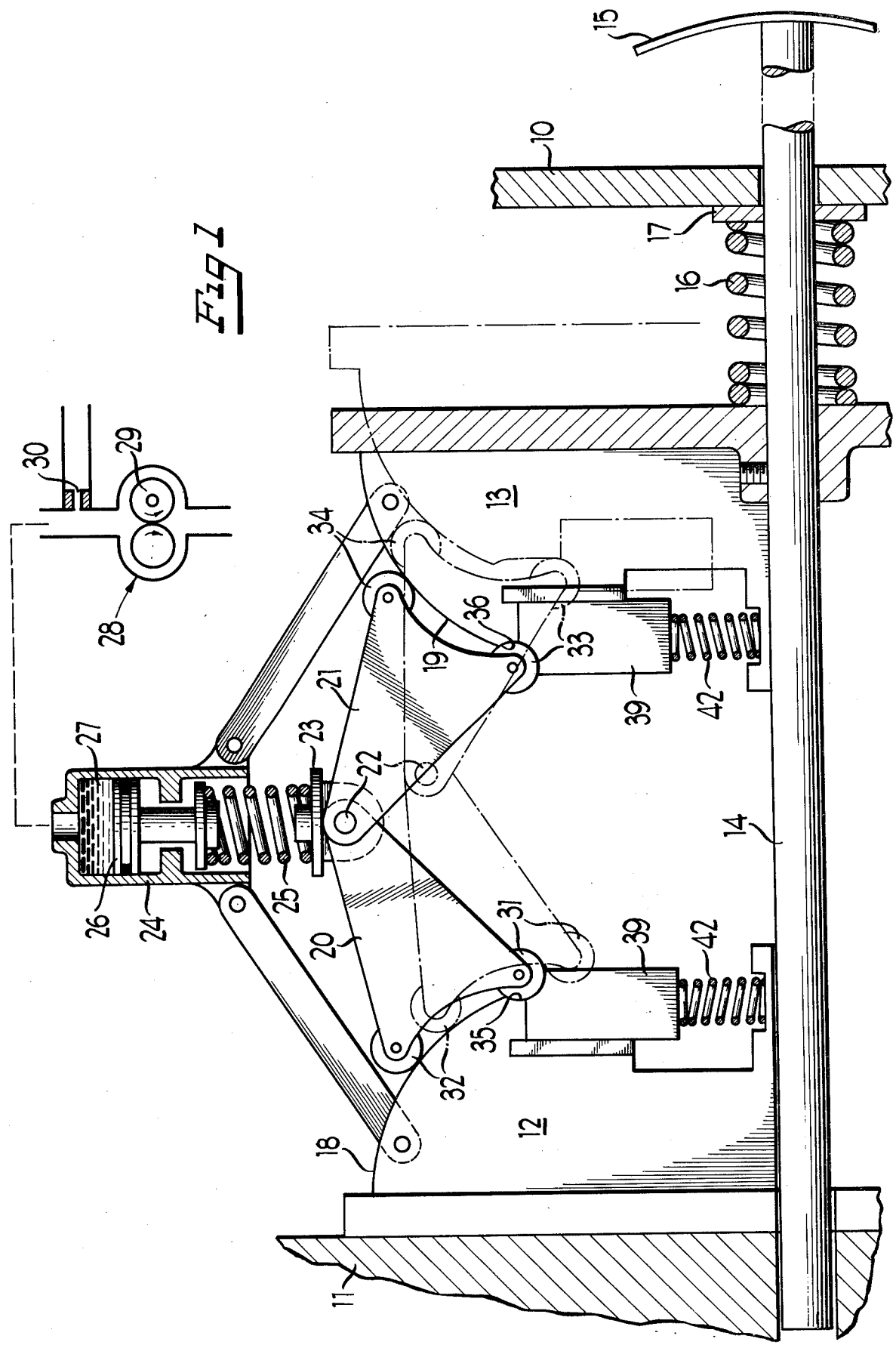

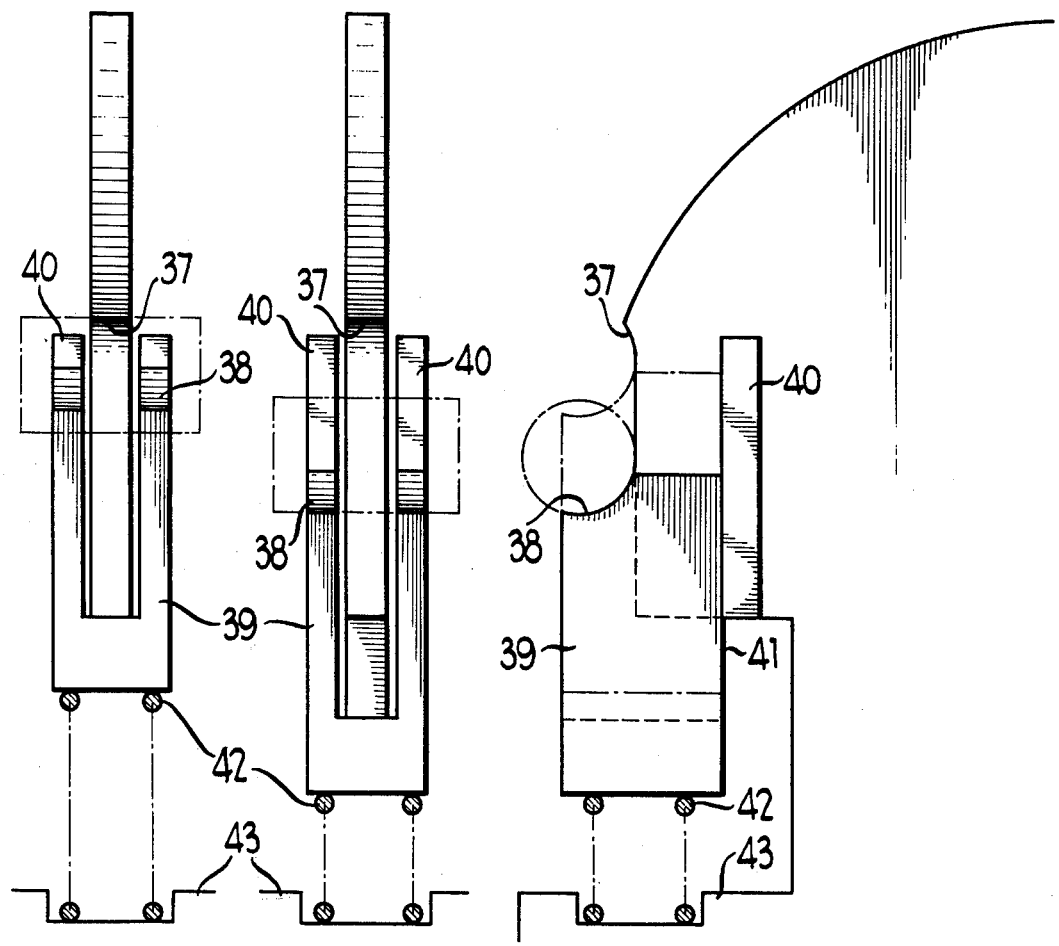

VEHICLE BUMPER ASSEMBLY

This invention relates to shock absorbing devices and particularly to such devices as are installed between a vehicle bumper and the body of the vehicle to absorb minor head-on collisions of the vehicle.

In my prior U.S. Pat. No. 3,789,948 for Motor Speed Actuated Vehicle Bumper granted Feb. 5, 1974, of which this device is an improvement there is disclosed a cam-and-link form of shock absorbing device for a vehicle bumper wherein means are provided for changing the resistance of the bumper to shock in accordance with the speed of the vehicle on which the bumper is installed. Howver, to avoid extreme sensitivity to shock, a detent is incorporated in the shock absorbing mechanism which prevents movement under shock until the shock achieves a predetermined magnitude.

The total available travel of the shock absorbing device under impact in my aforesaid patent remains the same at all vehicle speeds however, so that the vehicle bumper is in its maximum extended condition regardless of the speed of the vehicle. This makes the vehicle unnecessarily long while parking, particularly where both front and rear bumpers are equipped with the shock absorbing device.

It is recognized that the greater the vehicle speed at the instant of collision, the longer the time required to dissipate the force of the collision to avoid excessive deceleration forces in both the vehicle and its occupants. This means that the greater the vehicle speed, the greater should be the extension of the shock absorbing device to provide for the maximum travel of the bumper, and the least rate of deceleration. Obviously, ideal shock absorbing conditions cannot be attained since the degree of extension at high vehicle speeds for damage-free deceleration would require an impractical extension of the bumper and associated shock absorbing device.

It is an object of this invention to improve my prior shock absorbing device by providing means for automatically varying the degree of extension of a vehicle bumper attached to said device, in accordance with the speed of the vehicle.

A more specific object of this invention is to change the form of the detent mechanism for my aforesaid shock absorbing device so that it will retain its present release point, but it will have a resiliently held back-up point which moves against the resistance of a spring to extend the bumper as the vehicle speed increases.

These and other objects of this invention will become apparent from the following detailed description of a preferred embodiment thereof when taken together with the accompanying drawings, in which:

FIG. 1 is a diagrammatic representation in plan view of the shock absorbing device of this invention;

FIG. 2 is an enlarged plan view of one of the cams of the device showing the novel detent means;

FIG. 3 is an end elevation of cam of FIG. 1; and

FIG. 4 is an end elevation corresponding to FIG. 3 and showing the cam in a different stage of operation.

In the preferred form chosen to illustrate this invention, the detent, instead of comprising a roller in a notch of fixed dimension, has a two-piece notch, the piece normally used to restrain the roller being fixed as before, but the second piece being slidably mounted with reference to the first piece, with resilient means constantly urging the second piece and the roller toward the fixed piece to cause the combination to function as a normal detent. The slidable mounting allows the detent to be designed to hold the bumper in retracted position under stand-still or very low vehicle speeds, and to allow the bumper to be progressively extended as the vehicle speed increases.

Referring now to the drawings for a detailed explanation of the invention, the device, as described more fully in my aforesaid U.S. Pat. No. 3,789,948, is comprised of a fixed frame 10 which is a part of the vehicle chassis and which has a second part 11 spaced from the first part 10 inwardly of the vehicle. The two frame parts 10 and 11 comprise spaced abutments between which the shock absorbing device of this invention is installed.

The shock absorbing device is comprised of substantially identical oppositely disposed cams 12 and 13, cam 12 being fixed to abutment 11 and cam 13 being fixed to a rod 14 which is slidably retained by cam 12 and which passes through abutment 10 to the exterior of the vehicle chassis where its free end is secured to the bumper 15 of the vehicle. It is comtemplated that the device of this invention will cause bumper 15 to be closer to abutment 10 at zero to low speeds of the vehicle and will cause bumper 15 to move outward of the vehicle, i.e., will be extended progressively from the vehicle as the vehicle speed increases.

Between cam 13 and abutment 10 is a spring 16 bearing against a thrust washer 17, the spring providing a force which urges cam 13 toward cam 12.

The cams 12 and 13 have curved surfaces 18 and 19 on which ride substantially identical carriages 20 and 21 of triangular form, their apices being pivoted on a common pivot 22. Said pivot 22 is mounted on a washer 23 concentric with a cylinder 24 in which is a spring 25 abutting at one end against washer 23 and at its other end upon a piston 26, the upper end of which is exposed to liquid 27 under varying pressure. It may be noted that liquid 27 is incompressible.

The source of liquid 27 is a gear pump 28 the driving gear 29 of which is driven in timed relation to the final drive of the vehicle, i.e., to the speed of the vehicle. An orifice 30 in the output of pump 28 determines the pressure of the liquid 27 in cylinder 24.

Thus, as vehicle speed increases, the pressure of liquid 27 increases, which then pushes piston 26 downward in its cylinder 24 to compress or preload spring 25, and this, in turn, through said spring 25, pushes pivot 22 down. The latter movement causes carriages 20 and 21 to develop a sideward thrust tending to move cam 13 to the right as viewed in FIG. 1 against the resistance of spring 16 and carry with it rod 14 and bumper 15, thus extending bumper 15 outward from the vehicle and holding said bumper in its extended position.

Carriages 20 and 21 each have spaced rollers 31, 32, 33 and 34, respectively, which ride on cams 12 and 13 when bumper 15 is pushed inwardly, i.e., to the left in FIG. 1 as in a front end collision. When the device is in repose, however, spring 16 pushes cam 13 toward cam 12, and this causes the carriages 20 and 21 to move up on their cams as shown in solid lines in FIG. 1. Movement of the carriages upward along the cams is delayed by a detent arrangement of which rollers 31 and 33 are a part. The delay is desired so that front end collisions at low speeds will be taken up by the resilience in the bumper itself without setting the cams in motion.

The detent arrangement includes notches 35, 36 in cams 12 and 13, respectively, the notches being formed at their upper ends by a step (FIG 2) 37 in each cam and at the bottom ends by a step 38 in a forked slide 39 which embraces the region of the cam adjacent step 37. A supporting way 40 is formed on each side of the cam on which side 41 of slide 39 is supported and slides. The bottom of each slide rests upon a spring 42 bearing at its other end against an extension 43 of the cam.

Thus, as the speed of the vehicle increases, the pressure upon piston 26 increases, which causes the piston to move downward in its cylinder against spring 25. Said spring 25 is stiffer than spring 16 and, hence, the latter will yield and allow the carriages 20 and 21 to move downward on cams 12 and 13 away from the step 37 in each. Springs 42 are also softer than spring 25 and in addition are each softer than spring 16. It is contemplated that the sum of the forces exerted by springs 16 and 42 will be equal to or less than the force exerted by spring 25.

The use of slides 39 and springs 42 enables the bumper 15 to be extended in proportion to the speed of the vehicle. This provides greater travel of the bumper in a collision and, hence, a more gradual dissipation of the force of the collision. The arrangement thus gives protection for collisions at higher speeds than is possible with the arrangement shown in my aforesaid patent.

The liquid 27 may be oil and, hence, is incompressible so that it acts as a solid in cylinder 24 against which piston 26 bears when a collision occurs. A fixed reaction point is thus provided by liquid 27 for spring 25 which then constitutes the main shock absorbing means for the collision force. Spring 16, being in series with spring 25, shares in this shock absorbing function with spring 25, but being weaker, is compressed at a faster rate than spring 25.

Simultaneously with the compression of spring 25 by the force of the collision against bumper 15, liquid in cylinder 24 is forced out of orifice 30, pump 28 under collision conditions ceasing to function because of the halting of the vehicle by the collision. As liquid escapes through orifice 30 additional energy is absorbed by the bumper assembly.

I claim:

1. A vehicle bumper assembly comprising an abutment on the exterior of the vehicle, a support on the vehicle for slidably holding the abutment on the vehicle, and continuously operable means for moving said support relative to the vehicle to change the location of the abutment relative to the vehicle, said means comprising fluid pressure means, a pump for pressuring the liquid pressure means, means driving the pump in timed relation to the speed of the vehicle to vary the pressure of the fluid in accordance with the speed of the vehicle, and releasable means intermediate the fluid pressure means and support for transmitting the movement of the fluid pressure means to the support.

2. A vehicle bumper assembly, as defined in claim 1, said means comprising, a cam and follower, resilient means rating to retract the abutment in opposition to the force of the liquid under pressure, said abutment taking a position with respect to the vehicle in accordance with the balance of forces developed by the liquid and opposing resilient means, a detent between the cam and follower to delay the movement of the follower, said detent comprising a roller on the follower, a step on the cam, a slide mounted on the cam and movable relative thereto, a step on the slide facing the step on the cam, and resilient means urging the slide toward the step on the cam, said roller being mounted on the cam between said steps.

3. A vehicle bumper assembly as defined in claim 2, said abutment comprising a vehicle bumper, a rod reciprocable in a vehicle frame, said cam and follower comprising a pair of spaced cams, one of said cams being secured to a vehicle frame and the other being secured to the rod to move with the bumper, a pair of carriage means pivoted together at one end and each riding on one of the cams at their other ends, resilient means connected to the carriage means at said one end, and said source of liquid under pressure being connected to the last named resilient means at its other end.

* * * * *